Figure 1:
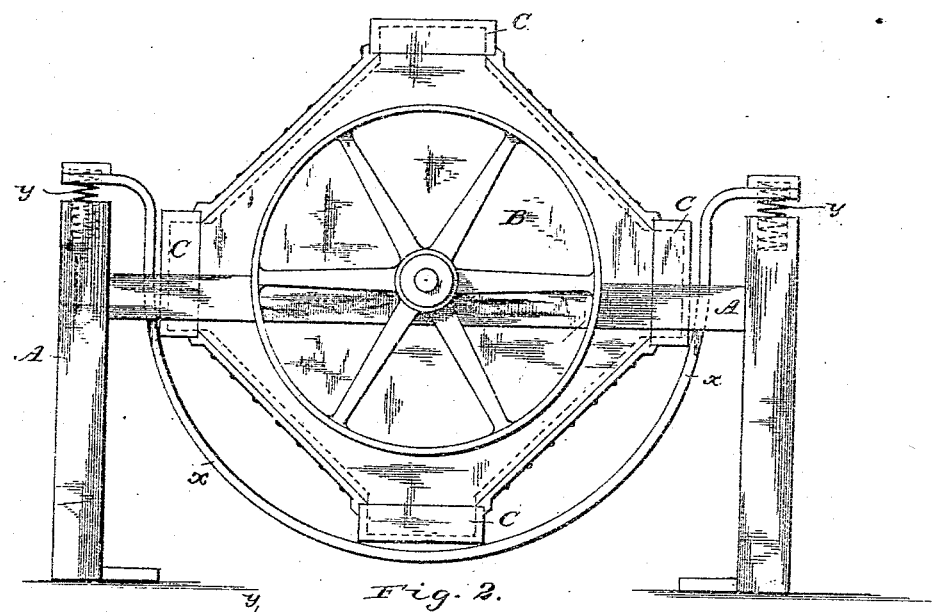

(No Model.) 2 Sheets—Sheet 1.

D. RALSTON.
MACHINE FOR SANDING BRICK MOLDS.

No. 321,528. Patented July 7, 1885.

Witnesses:
N. N. Low
E. A. Dick

Inventor:
David Ralston
by Marcellus Bailey
his Attorney (No Model.) 2 Sheets—Sheet 2.

D. RALSTON.
MACHINE FOR SANDING BRICK MOLDS.

No. 321,528. Patented July 7, 1885.

Witnesses:
H. N. Low
E. T. Dick

Inventor:
David Ralston
by Marcellus Bailey
his attorney

UNITED STATES PATENT OFFICE.

DAVID RALSTON, OF TROY, NEW YORK.

MACHINE FOR SANDING BRICK-MOLDS.

SPECIFICATION forming part of Letters Patent No 321,528, dated July 7, 1885.

Application filed February 5, 1883. (No model.)

*To all whom it may concern:*

Be it known that I, DAVID RALSTON, of the city of Troy, in the State of New York, have invented certain new and useful Improvements in Machines for Sanding Brick-Molds, of which the following is a specification.

My invention has reference to the operation of sanding molds for brick; and its object is to obtain a simple and effective machine for the purpose.

In the machine which I have devised there is a rotary sand-containing drum formed with peripheral openings for the reception of the molds, which are successively applied to and removed from the drum while the latter is continuously revolving.

In the operation of the machine the molds, as the drum revolves, are successively applied to the top openings of the drum, are then carried around by the latter, and in thus moving are, as they come underneath, filled with the sand contained in the drum, and then as they, moving still with the drum, again rise the sand is emptied from them, and they return to a position where they can be successively removed from the drum and replaced by other molds.

The main characteristic of my machine resides in the means for holding the drums in place. The molds are fitted to or in the openings in the drum, and so long as they occupy a position above the axis of revolution of the latter they will retain their position on the drum; but when they are below the axis of revolution of the drum they will, unless restrained by some means, fall off from the drum. To prevent this I encircle the lower half (more or less) of the drum with what may be termed a "concave mold-holding bed," against which the molds bear so long as they are below the axis of the drum—that is to say, so long as they are so positioned that they are liable to fall off by gravity. The advantage of this arrangement is that the molds are held positively on the drum only so long as they are in a position in which they would otherwise be liable to fall off—that is to say, only so long as they are, in effect, below the axis of revolution of the drum, and that at all other times they are entirely free and need rest on the drum by gravity only, thus putting them in a condition to be most readily removed and replaced by others.

What I have termed the "concave mold-holding bed" may be obviously formed in a variety of ways—as, for instance, by straps encircling the lower or under half of the periphery of the drum, by curved segments, or by other means that will suggest themselves to the skilled mechanic. I prefer also to make this bed elastic, so that it may hold snugly up against the molds, and yet be able to yield to any irregularities in the drum or molds, or both. These and other features of my improvements will be readily understood by reference to the accompanying drawings, in which—

Figure 2:
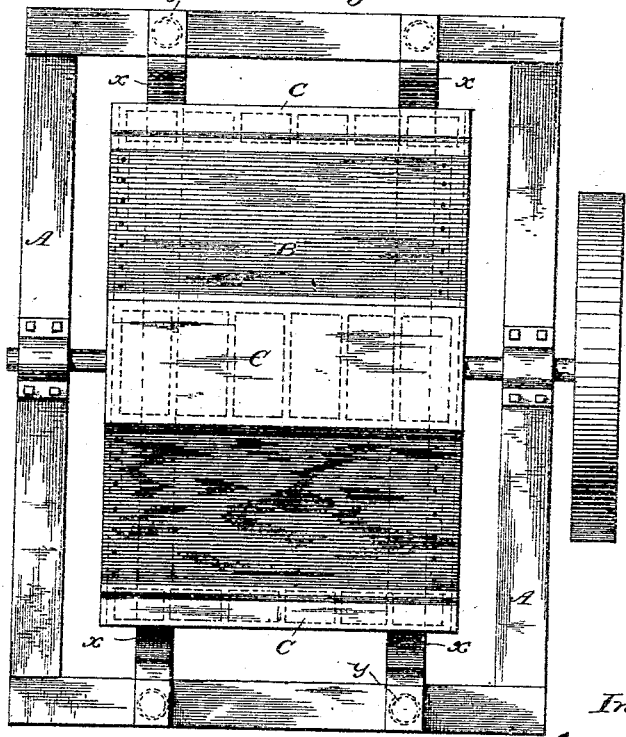
Figure 3:
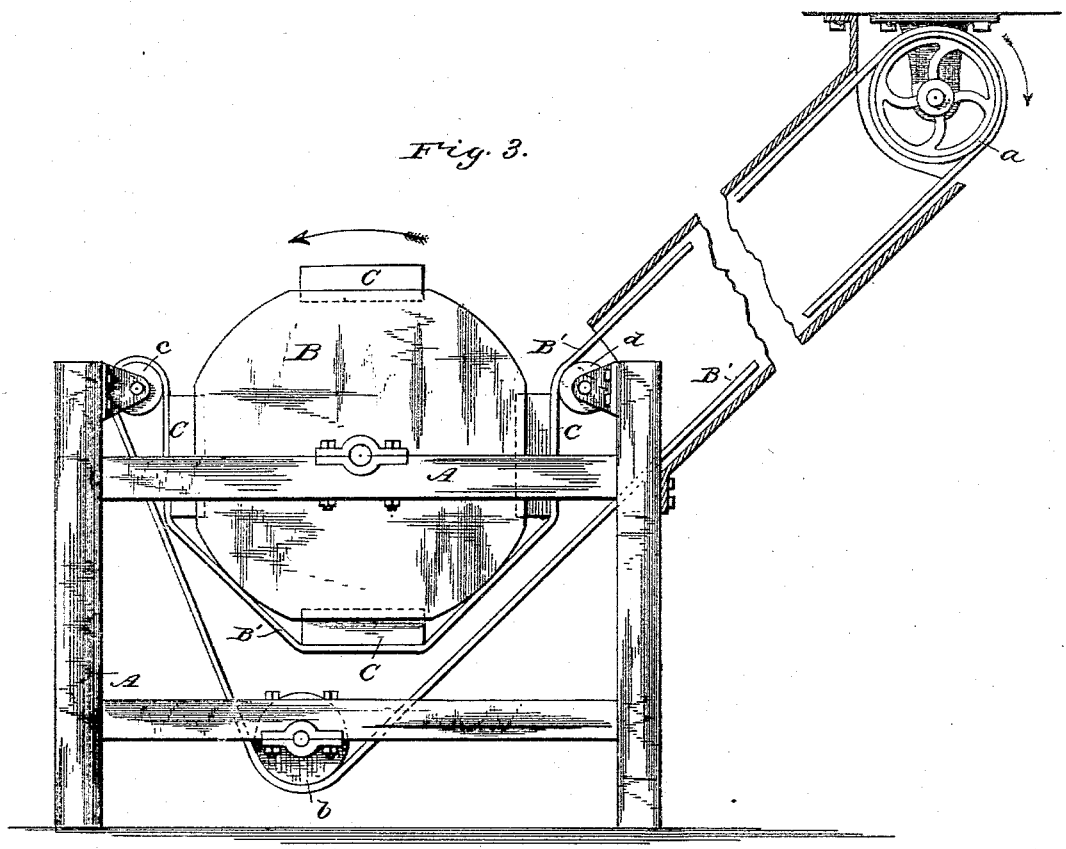
Figure 4:
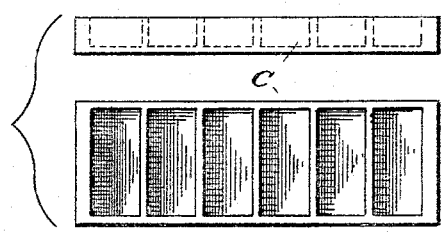

Figure 1 represents, in side elevation, one convenient form of machine for effectuating my invention. Fig. 2 is a plan of the same. Fig. 3 is a side elevation of another arrangement for the same purpose. Fig. 4 is a view of one of the molds.

The direction of rotation of the drum is indicated by the arrows.

Only so much of the machine is represented as is required for the purposes of explanation.

A is the supporting-frame, which carries in suitable bearings the sand-containing drum B, provided with peripheral openings, to which are applied the brick-molds C, bottom outward. The drum is designed to be continuously rotated, which is effected, in the machine shown in Figs. 1 and 2, by means of a suitable prime mover geared to the axle or hub of the drum at one end, and the molds to be sanded (which rest by gravity on the drum) are successively fitted to the openings in the drum by an attendant who stands on one side of the machine—for instance, on the left of machine—and after passing around with the drum, and having been filled with the sand contained therein, are, as they rise above the center of the drum sufficiently far to let the sand (except that which adheres) drop from them, removed by another boy or attendant on the right of the machine. In order to admit of this mode of operation, the molds on the drum manifestly must be held in place thereon so long as they are underneath or below the axis of revolution of the drum. It is with this in view that I make use of what I have hereinbefore termed a "concave mold-holding bed." This bed, in the machine shown in Figs. 1 and 2, consists of two curved or semicircular straps, x, which are of metal or other suitable material and of a proper width, and are at their upper ends attached to or supported in bearings in the frame A. These straps encircle the lower half (more or less) of the drum, and the molds C run in contact with them during the time they are below the axis of the drum. Thus the molds are held in place during this period of the revolution, and are at all other times free, so that they can be handled by the attendants without trouble. I prefer sometimes to support the ends of the straps by springs y, as shown, whereby said straps are upheld with yielding pressure against the drum, for the purposes hereinbefore indicated.

In lieu of the continuous straps x, it is evident that straps formed of abutting curved segments may be employed, which also may be spring-upheld, and may be joined together at their abutting ends; or other suitable means may be used for the purpose, what is essential being that there should be combined with the drum a concave mold-holding bed, with which the molds contact during the lower half of the revolution of the drum.

In the arrangement shown in Fig. 3 I utilize the mold-retaining device as a means for driving the drum. To this end I replace the straps by an endless belt, B', which passes around pulleys a b c d. Pulleys c d are placed at an elevation somewhat above the axis of the drum, and are so located that the portion of the belt intermediate between the two will pass around and have close contact with the lower half of the sanding-drum. Pulley a is the driving-pulley, deriving its movement from any suitable prime mover. When pulley a is revolved, the belt will be put in movement, with the result of imparting rotary movement to the sanding-drum. At the same time the belt, like the straps x, serves to hold the mold in place during the requisite portion of the revolution of the drum.

The belt, which is of no great width, is not in the way of the attendant. Furthermore, that portion of it between the driving-pulley and the drum is incased, so that the attendant on that side cannot be inconvenienced.

In some cases it may be desirable to incase the whole of the belt, except, of course, that part which runs in contact with the drum.

A tightening-pulley can be used in connection with the belt, if desired.

With reference to the arrangement last described I remark that while I believe myself to be the first inventor of a sanding-machine in which is combined a continuously rotating sanding-drum and a concave mold-holding bed, whether composed of straps or of other instrumentalities for retaining the loose molds on the drum during the lower half of their revolution, I do not broadly claim that particular species of such a bed which consists of endless pliable straps moving in unison with the drum.

What I do claim as new and of my own invention is as follows:

1. The combination of a revolving sanding-drum provided with mold-receiving openings, and a concave mold-holding bed applied to the under portion of said drum in position to contact with the molds thereon, substantially as and for the purposes hereinbefore set forth.

2. The combination of a revolving sanding-drum provided with mold-receiving openings, and a yielding concave mold-holding bed applied to the under portion of said drum, and arranged and adapted to bear against the molds thereon, substantially as and for the purposes hereinbefore set forth.

3. The combination of a revolving sanding-drum provided with mold-receiving openings, and mold-retaining straps encircling the lower half or under portion of the drum in position to bear against and retain the molds thereon.

4. The combination of a revolving sanding-drum provided with mold-receiving openings, and yielding mold-retaining straps encircling the lower half or under portion of the drum in position to bear against and retain the molds thereon, substantially as and for the purposes hereinbefore set forth.

5. The combination, with the sanding-drum provided with mold-receiving openings, of an endless power-driven belt arranged and operating both to impart rotary movement to the drum and to hold the molds in place thereon, substantially as hereinbefore set forth.

In testimony whereof I have hereunto set my hand this 29th day of January, 1883.

DAVID RALSTON.

Witnesses:
WILLIAM LORD,
THOMAS GALVIN.